United States Patent [19]
de Groot et al.

[11] 3,709,697
[45] Jan. 9, 1973

[54] FURANONE MEAT FLAVOR COMPOSITIONS

[75] Inventors: Cornelis Nicolaas de Groot, Zevenaar, Netherlands; John S. Hobbs, Rushden, England; Christiaan Herman Theodoor Tonsbeek, Zevenaar, Netherlands

[73] Assignee: Lever Brothers Company, New York, N.Y.

[22] Filed: March 20, 1970

[21] Appl. No.: 21,496

[30] Foreign Application Priority Data

March 25, 1969 Great Britain.....................15,561/69

[52] U.S. Cl..................99/107, 99/124, 99/140 R, 99/140 N
[51] Int. Cl...............................................A23l 1/26
[58] Field of Search............................99/140, 140 R

[56] References Cited

UNITED STATES PATENTS

| | | | |
|---|---|---|---|
| 2,918,376 | 12/1959 | May | 99/140 |
| 3,030,213 | 4/1962 | Tidridge | 99/140 X |
| 3,231,385 | 1/1966 | Ziro | 99/140 UX |
| 3,408,206 | 10/1968 | Yamazaki | 99/140 |
| 3,455,702 | 7/1969 | Willhalm | 99/140 |

OTHER PUBLICATIONS

Dorothy B. Marsh, ed., "The Good Housekeeping Cook Book," 217 and 508, Rinehart, New York, 1949.
J. O. Rodin et al., J. Food Sci., 30(2), 280-5 (1965).
C. H. T. Tonsbeck et al., J. Agr. Food Chem., 16(6) 1016-21 (Nov. 1968).

*Primary Examiner*—Morris O. Wolk
*Assistant Examiner*—Sidney Marantz
*Attorney*—Louis F. Kline, Jr., Melvin E. Kurtz and Edgar E. Ruff

[57] ABSTRACT

Meaty foodstuff in which the flavor of a meaty product or a meat simulating product is improved by the incorporation of 2,5-diethyl- or 2,5-methyl-ethyl-4-hydroxy-2,3-dihydrofuran-3-one or a precursor of these compounds.

6 Claims, No Drawings

FURANONE MEAT FLAVOR COMPOSITIONS

The invention relates to processes for imparting a meaty flavor to certain foodstuffs or improving such flavor and to concentrated as well as ready-for-use foodstuffs obtained according to the process.

It has been proposed to improve the flavor of various foodstuffs which contain meat or meat simulating product, by adding certain components such as protein hydrolysate, monosodium glutamate, 5'-nucleotides, organic carboxylic acids and the like. Although the products thus obtained often possess a meaty taste, their odor usually is not satisfactory.

It has now been found that a meaty flavor can be enhanced or imparted to foodstuff which contains meat or a meat simulating product by the incorporation of certain furanones.

Accordingly the present invention provides a foodstuff comprising a meat product or a meat simulating product and a 4-hydroxy-2,3-dihydrofuran-3-one of the general formula:

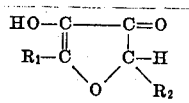

in which $R_1$ and $R_2$ represent an alkyl group containing one or two carbon atoms, and in which the sum of the carbon atoms of $R_1$ and $R_2$ together is from 3–4. The dihydrofuranone may be incorporated as such, or in the form of precursors or reactants yielding the desired compound after completion of the preparation of the foodstuff in a form ready for consumption.

The general formula covers two compounds, viz. 2-methyl-5-ethyl-4-hydroxy-2,3-dihydrofuranone-3 and 2,5-diethyl-4-hydroxy-2,3-dihydrofuranone-3. The compounds mentioned above show keto-enol tautomerism, but it has appeared that normally the compounds predominantly occur in the structure represented in the structural formula given above. This appears inter alia from the infrared and n.m.r. spectra. Theoretically, however, it may be expected that the compound occurs in various other tautomeric forms such as the diketo and the dienol forms which, however, are then again converted into the indicated form.

By special techniques other tautomeric forms or mixtures thereof can be isolated from the hydroxydihydrofuranones mentioned above, which, however, are then again converted into the indicated form. According to the present invention also these other tautomeric forms or mixtures thereof can be incorporated into foodstuffs which contain meat or a meat simulating product.

The hydroxydihydrofuranones which are used according to the present invention can be prepared by heating and reacting a diketo diester of the general formula:

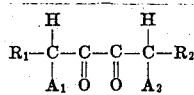

in which $R_1$ and $R_2$ represent an alkyl group containing one or two carbon atoms, with the provision that the number of carbon atoms of $R_1$ and $R_2$ together is from 3–4 and $A_1$ and $A_2$ represent acid radicals. The acid radicals may be derived from carboxylic acids, especially from lower aliphatic carboxylic acids. Preferred ester groups are those derived from acetic and propionic acid.

The reaction is carried out in an aqueous acidic medium which contains at least 50 percent by volume, preferably at least 75 percent of water, the remainder being a water-miscible polar solvent such as a lower aliphatic alcohol for example methanol or ethanol.

The acidic compound present in the aqueous acidic medium may comprise an inorganic acid, a carboxylic acid or an organic sulphonic acid. Suitable acids include hydrobromic or hydrochloric acid, sulphuric acid, phosphoric acid, formic acid, acetic acid, propionic acid, p-toluene sulphonic acid and the like. Polycarboxylic acids and hydroxycarboxylic acids are less suitable. The use of strong acids, producing a pH-value below 5 or better below 4, is particularly preferred.

The amount of acid in the aqueous medium is not particularly critical and may vary widely. Good results have been obtained with amounts of 0.1–5 equivalents of acid per liter of medium. Also the concentration of the diketo diester in the aqueous medium may vary widely. Generally, less than 200 grams of diketo diester are dissolved per liter of medium. For practical reasons, in particular to reduce the volume of the reaction mixture, the use of too dilute solutions is avoided. A practical range is from 10–100 grams of diketo diester per liter of medium.

The reaction temperature and time of reaction are related. For convenient reaction periods in the range of 0.5 – 10 hours, preferably from 1 – 5 hours, it is preferred to conduct the reaction at temperatures above 75°C, preferably at boiling temperature at atmospheric pressure. It is however possible to obtain a satisfactory conversion at lower temperature, e.g., of about 50°C, provided the reaction period is suitably adjusted to at least 20 hours.

After termination of the reaction the aqueous reaction mixture is allowed to cool and the desired dihydrofuranone derivative is isolated in a conventional way. This could be done by extraction with ether, drying of the etheral solution and evaporation of the solvent. Undesired polymeric contaminants are removed by distillation of the product under diminished pressure.

The diketo diester starting materials for the process according to the invention can be prepared in various ways. A convenient method is via acetylenic compounds.

Step 1 — Preparation of an alkyne diol.

Acetylene was coupled with two moles of aldehyde using two moles of a Grignard compound. This method is described in Bull. Soc. Chim. - France 425 (1956). Alternatively a 1-alkyne-3-ol could be coupled with aldehydes or ketones (as described in Bull. Soc. Chim. supra).

Step 2 — Esterification of the alkyne diol.

The diacetates were prepared by reacting with acetic anhydride in the presence of, e.g., pyridine or sodium acetate.

Step 3 — Oxidation of the alkyne diester.

The alkyne diester was oxidized with dilute aqueous potassium permanganate at a low temperature yielding the diketo diester. This method has been described in Bull. Soc. Chim. (France) 789 (1949).

EXPERIMENT 1

This example describes the preparation of 2,5-diethyl-4-hydroxy-2,3-dihydrofuran-3-one.

2 moles of propionaldehyde were coupled with 1 mole of acetylene under the influence of ethylmagnesium bromide according to Bull. Soc. Chim. (France) 425 (1956) and 4-octyne-3,6 diol (b.p. 120°C at 4 mm) was obtained in 50 percent yield.

The alkyne diol (14.2 g or 0.1 mole) was acetylated by gently refluxing for 2 hours with acetic anhydride (20.4 g) in the presence of freshly molten sodium acetate (0.82 g). After cooling the reaction mixture was poured into a flask containing 200 g of crushed ice. The reaction mixture was extracted with ether and the organic layer separated. After washing repeatedly with small quantities of 5 percent aqueous sodium bicarbonate the etheral solution was dried over anhydrous sodium sulphate and the ether evaporated off. The residual liquid was distilled under vacuum and 4-octyne-3,6-diacetate (b.p. 103°–105°C at 2,3 mm) was obtained in 95 percent yield.

5.16 g (0.02 mole) of 4-octyne-3,6-diacetate were dissolved in 500 ml ethanol-water (90:10 by volume). To this solution which was cooled to −20°C were slowly added 17.5 g of potassium permanganate and 25 g of magnesium sulphate heptahydrate dissolved in 500 ml water. During this addition which took 2 hours the temperature was maintained at −20°C. After stirring for an additional 2 hours at the same temperature 200 ml of water were added and the brown reaction mixture was extracted three times with 200 ml portions of cold chloroform. The chloroform solutions were combined and dried over anhydrous sodium sulphate. Chloroform was evaporated off, and 60 percent of octane-4,5-dione-3,6-diacetate were obtained.

5.16 g of octane-4,5 dione-3,6-diacetate was heated with 1,500 ml of 0.5 N aqueous hydrochloric acid for 3 hours at a temperature of 100°C. After extracting with ether and combining the extracts, washing and drying took place. The solvent was evaporated and 4g of an orange colored residue were obtained. The residue was distilled at diminished pressure and the distillate was investigated by means of gas-liquid chromatography which showed only one peak.

A sample was further investigated by preparative thin-layer chromatography and checked by infrared and mass spectrometry. 2,5-diethyl-4-hydroxy-2,3-dihydrofuran-3-one (m.p. −5°C) was found present in a yield of 35 percent. The smell of the product closely resembled that of the corresponding dimethyl compound.

EXPERIMENT 2

This example describes the preparation of 5-ethyl-2-methyl-4-hydroxy-2,3-dihydrofuran-3-one.

1 mole of 1 butyne-3-ol was coupled with 1 mole of propionaldehyde under the influence of ethylmagnesium bromide according to Bull. Soc. Chim. (France) 425 (1956) and 3-heptyne-2,5-diol (b.p. 109°–110°C at 2 mm) was obtained in 60 percent yield. The alkyne diol was acetylated as described in Experiment 1 and 3-heptyne-2,5-diacetate (b.p. 103°–105°C at 3 mm) was obtained in 95 percent yield. The alkyne diacetate was oxidized with aqueous potassium permanganate as described in Experiment 1, also at a temperature of −20°C and heptane-3,4-dione-2,5-diacetate was obtained in 90 percent yield.

2.44 g of heptane-3,4-dione-2,5-diacetate was added to 750 ml of 0.5 N aqueous hydrochloric acid and the mixture was refluxed for 2 hours. After extracting with ether and combining the extracts, washing and drying took place. The solvent was evaporated and 2 g of a dark yellow residue were obtained. Gas-chromatography showed two peaks very close together. Further attempts to separate the two peaks failed. Infrared and mass spectrometry suggest that 5-ethyl-2-methyl-4-hydroxy-2,3-dihydrofuran-3-one, possibly together with 2-ethyl-5-methyl-4-hydroxy-2,3-dihydrofuran-3-one, is present. The boiling point of the product estimated from gas-liquid chromatography volatility is 208°–210°C. The yield of this product was 28 percent.

The process according to the invention relates, as stated, to imparting a meaty flavor to foodstuffs which contain meat or a meat simulating product or improving such flavor. Under such foodstuffs are to be understood here foods ready for consumption and concentrated foodstuffs in which a meaty flavor is desired, such as soups, including concentrated canned soup and dry soup mixes, preserved meals, rissoles, preserved meat such as canned ham, simulated meat gravy, gravy tablets or cubes, and "powdered flavor" such as that which may be sprinkled over meaty foodstuffs shortly before consumption.

In another embodiment precursors or reactants are incorporated, which during the preparation of the ready-for-use product are converted into the 2,3-dihydrofuran-3-one. For example esters such as the acetates may be used. Furthermore enol-esters and ketals derived from the compounds may also be used.

The type of foodstuffs which can be improved as to flavor according to the invention varies widely, the concentrations in which the 2,3-dihydrofuran-3-ones are applied also range widely. When incorporating 4-hydroxy-2,3-dihydrofuran-3-ones good results are obtained at levels varying from 0.1 to 30 parts per million calculated on the foodstuff in the ready-for-consumption form; best results are obtained in the range from 0.5 to 10 parts per million.

The use of the compounds at levels below their individual threshold values of about 0.5 parts per million may take place where two or more substituted isomeric 4-hydroxy-2,3-dihdyrofuran-3-ones are used together and such a combination may result in a more favorable taste than could be obtained with the compounds separately. As these concentrations apply in the case of foods ready for consumption, it is obvious that where more concentrated foodstuffs, such as canned concentrated soups, dry soup mixes and seasoning compositions are involved appreciably higher concentrations may be used, dependent on the degree of dilution they undergo during preparation.

Where precursors or reactants which are converted into the desired compounds are used the quantities incorporated are generally higher than those indicated above in order to overcome the effects of the reaction not taking place quantitatively.

The substances incorporated according to the invention are not quite stable against oxidative attack and oxidation and decomposition products may also contribute appreciably to the desired flavor. For storage it may therefore be desirable to prepare the 2,3-dihydrofuran-3-ones in a stabilized form as, e.g., encapsulated or coated with another material. Also, operation in an inert atmosphere may be feasible.

In order to obtain products with a fuller meaty taste and flavor the 2,3-dihydrofuran-3-ones may be utilized together with other substances such as one or more compounds from the following classes of substances. Preferred mixtures are combinations of compounds mentioned under classes I, II and III, together with a 4-hydroxy-2,3-dihydrofuran-3-one as previously defined.

The dihydrofuranones as previously defined may be used together with the dihydrofuranones as defined under IV below.

I. Amino acids which may be obtained simply by hydrolysis, autolysis or fermentation or by combination of these from vegetable or animal proteins such as gluten, casein, soyabean protein and the like.

II. Nucleotides, such as adenosine-5'-monophosphate, guanosine-5'-monophosphate, inosine-5'-monophosphate, xanthosine-5'-monophosphate, uridine-5'-monophosphate, cytidine-5'-monophosphate, and their amides, desoxy derivatives and salts. Combinations of several nucleotides such as guanosine-5'-monophosphate and inosine-5'-monophosphate are particularly suitable.

III. Carboxylic acids such as lactic acid, glycolic acid and $\beta$-hydroxy butyric acid on one hand and dicarboxylic acids as succinic acid, gluteric acid and the like on the other hand, and especially mixtures in which succinic acid and lactic acid occur in weight ratios of 1:30 to 1:150.

IV. A substituted 4-hydroxy-2,3-dihydro-furan-3-one of the general formula:

$$\begin{array}{c} HO-C\underline{\phantom{xx}}C=O \\ \phantom{xx}\|\phantom{xx}\| \\ CH_3-C\phantom{xx}C-H \\ \phantom{xx}\diagdown O \diagup \diagdown R \end{array}$$

in which R represents —H or —CH$_3$.

V. Pyrrolidone carboxylic acid or precursors thereof.

VI. Peptides such as alanyl-alanine, alanyl-phenylalanine, alanyl-asparagine, carnosine, anserine.

VII. Sweetening substances, both artificial, like saccharine or cyclamates, and natural, particularly mono- and disaccharides.

VIII. Substances with the flavor of meat or broth, particularly sulphur containing compounds, such as reaction products of amino acids like cysteine/cystine with reducing sugars, such as ascorbic acid, reaction products of hydrogen sulphide with lower aliphatic aldehydes and ketones (e.g., propionaldehyde, crotonaldehyde, methional, mercapto-acetaldehyde).

IX. Other volatile sulphur compounds, such as H$_2$S mercaptans, disulphides and sulphides, such as dimethyl sulphide and diallyl sulphide.

X. Guanidines, such as creatine and creatinine.

XI. Salts, such as NaCl and phosphates, particularly, in connection with the pH so-called acid phosphates like Na$_2$HPO$_4$, NaH$_2$PO$_4$ or other alkali or ammonium phosphates and organic phosphates, such as phosphorus containing amino acids. However, it is by no means necessary to incorporate phosphates.

XII. Nitrogen compounds, such as ammonia, amines, urea, indole, and skatole, XIII. Saturated or unsaturated carboxylic acids with from about two to 12 carbon atoms.

XIV. Saturated or unsaturated higher hydroxycarboxylic acids and $\alpha$ and $\delta$-lactones derived therefrom, such as deca and dodeca-5-olide; 2,3-dimethyl-2,4-alkadiene-4-olides.

XV. Lower saturated and unsaturated aldehydes, e.g., acetaldehyde, propion-aldehyde, iso-butyraldehyde and hepten-4-al.

XVI. Lower saturated and unsaturated ketones, such as acetone, butanone and diacetyl.

XVII. Tricholomic acid and ibotenic acid or their salts.

XVIII. Optionally aromatic carboxylic and/or heterocyclic compounds, such as ortho amino-acetophenone, N-acetonyl pyrrole, maltol, iso maltol, ethyl maltol, lenthionine, hypoxanthine, guanine, inosine and guanosine.

XIX. Lower saturated and unsaturated alcohols, such as ethanol, octanol.

XX. Coloring substances, such as curcuma, caramel.

XXI. Thickening agents such as gelatin and starch.

The dosage of these optional ingredients is dependent on the kind of flavor one wishes to imitate and moreover on the nature of the foodstuff to which the ingredients are added and the other ingredients added, such as herbs and spices.

By way of illustration the following Examples are given to elucidate the invention.

EXAMPLE 1

A gravy was prepared from the following ingredients:

|  | g |
|---|---|
| Potato starch | 15 |
| Onion powder | 2.5 |
| Monosodium glutamate | 3 |
| Tallow | 20 |
| Wheat flour | 15 |
| Caramel dye | 1.6 |
| Pepper | 0.02 |
| Bay leaf powder | 0.02 |
| Clove | 0.02 |
| Salt | 8 |
| Protein hydrolysate | 4 |
| Meat extract | 2 |
| Tomato powder | 1 |

The tallow was melted and potato starch and wheat flour were added whilst stirring. The remaining ingredients were then thoroughly mixed and added to the mixture containing the tallow, after which the resulting mixture was added to 1 liter of water and boiled.

The gravy thus obtained was divided into two parts of approximately 500 ml and to one of the samples 0.8 mg of 2,5-diethyl-4-hydroxy-2,3-dihydrofuran-3-one were added. The samples were evaluated against each other in a pair test by a panel consisting of 15 persons; 13 persons preferred the sample containing the furanone and indicated that the taste and flavor were more meat-like.

EXAMPLE 2

An imitation meat broth was prepared by dissolving 70 g sodium chloride and 50 g commercial meat extract in 10 liters of water. The meat broth thus obtained was divided into two quantities of approximately 5 liters and to one of these a quantity of 5 mg 2-methyl-5-ethyl-4-hydroxy-2,3 dihydrofuran-3-one was added.

After heating both samples they were evaluated against each other in a pair test by a panel consisting of 23 persons; 18 persons expressed a preference for the sample which had been aromatized with 2-methyl-5-ethyl-4-hydroxy-2,3-dihydrofuran-3-one and some indicated that this mixture had a taste characteristic of true meat broth.

EXAMPLE 3

A dry soup mix was obtained by mixing the following ingredients:

| | g |
|---|---|
| Sodium chloride | 90 |
| Vermicelli | 200 |
| Monosodium glutamate | 20 |
| Tallow | 50 |
| Dried meat | 60 |
| Casein hydrolysate | 20 |
| Dried onion | 30 |
| Dried carrots | 10 |
| Mixed spices | 4 |

5 liters of water were added to 250 g of the dry soup mix mentioned above and the mixture was boiled and separated into two portions of each about 2½ liters. To one of these 0.2 g dextrin-maltose was added and to the other one 0.2 g of a powder consisting of 1 part of 2,5-diethyl-4-hydroxy-2,3-dihydrofuran-3-one and 40 parts of dextrin-maltose.

Both samples were then heated to the boil and evaluated against each other by means of a triangle panel test. The difference between both samples was noted by a significant number of the 21 persons of the panel and the majority preferred th soup containing the dihydrofuran-3-one, because it was considered more reminiscent of beef broth.

What is claimed is:

1. A foodstuff comprising a meat product or a meat simulating product and a composition comprising a furanone of the general formula:

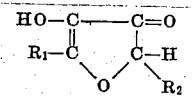

wherein $R_1$ and $R_2$ represent alkyl groups containing one or two carbon atoms, with the provision that the number of carbon atoms of $R_1$ and $R_2$ together is 3 or 4, said furanone being admixed with a substance selected from the group consisting of hydroxy carboxylic acids, dicarboxylic acids, a mixture of a hydroxy carboxylic acid with a dicarboxylic acid, and amino acids obtained by hydrolysis of proteins.

2. The foodstuff of claim 1 wherein the amino acids are casein hydrolysate.

3. The foodstuff of claim 1 wherein the mixture of a hydroxy carboxylic acid with a dicarboxylic acid is lactic acid and succinic acid, said succinic and lactic acids being present in the ratios of 1:30 to 1:150 respectively.

4. A foodstuff in accordance with claim 1, wherein said foodstuff is a soup.

5. A foodstuff comprising a meat product or simulated meat product having incorporated therein 0.05 to 50 parts per million based on the weight of said foodstuff, of a flavoring composition comprising a furanone of the general formula:

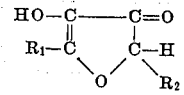

wherein $R_1$ and $R_2$ represents alkyl groups containing one or two carbon atoms, with the provision that the number of carbon atoms of $R_1$ and $R_2$ together is 3 or 4, said furanone being admixed with a substance selected from the group consisting of 5'-nucleotides, hydroxy carboxylic acids, dicarboxylic acids, a mixture of a hydroxy carboxylic acid with a dicarboxylic acid, and amino acids obtained by hydrolysis of proteins.

6. A method of flavoring a meat product or simulated meat product, comprising introducing an effective flavoring amount of a meat flavor composition consisting essentially of a 4-hydroxy-2,3-dihydrofuran-3-one of the general formula:

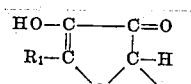

in which $R_1$ and $R_2$ represent lower alkyl groups containing one or two carbon atoms with the proviso that the total number of carbon atoms of $R_1$ and $R_2$ together is 3 or 4 admixed with a substance selected from the group consisting of 5'-nucleotides, hydroxy carboxylic acids, dicarboxylic acids, and amino acids obtained by hydrolysis of proteins.

* * * * *